(No Model.)
P. C. JUST.
UNDERGROUND TROLLEY ARM.
No. 532,157. Patented Jan. 8, 1895.
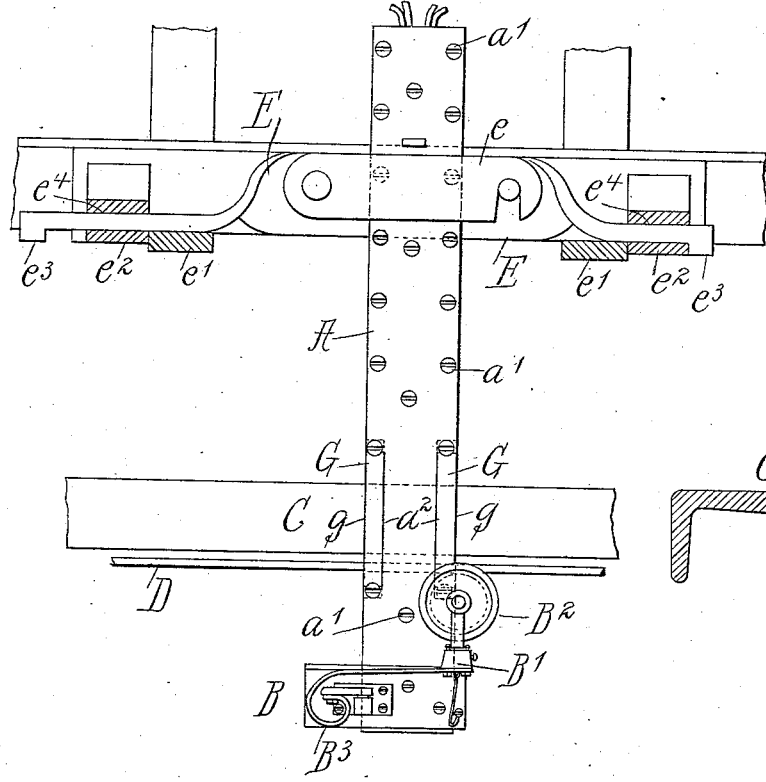
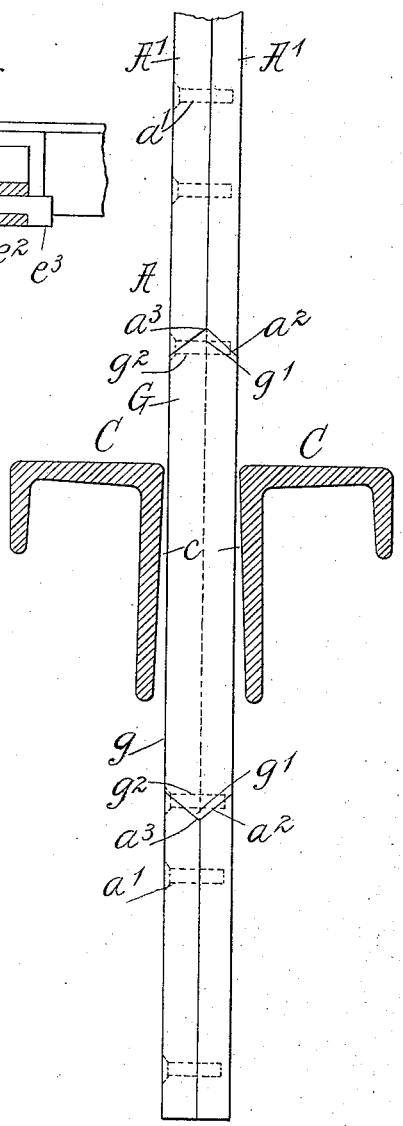
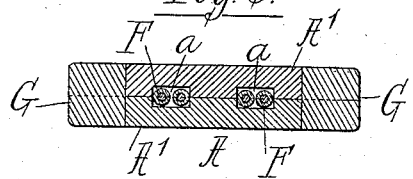
Witnesses
Jno. W. Adams
Louis M. F. Whitehead
Inventor
Paul C. Just
by Dayton, Poole & Brown
his Attorneys

UNITED STATES PATENT OFFICE.

PAUL C. JUST, OF CHICAGO, ILLINOIS, ASSIGNOR TO ALBERT G. WHEELER, OF SAME PLACE.

UNDERGROUND-TROLLEY ARM.

SPECIFICATION forming part of Letters Patent No. 532,157, dated January 8, 1895.

Application filed January 4, 1894. Serial No. 495,678. (No model.)

*To all whom it may concern:*

Be it known that I, PAUL C. JUST, of Chicago, in the county of Cook and State of Illinois, have invented certain new and useful Improvements in Underground-Trolley Arms; and I do hereby declare that the following is a full, clear, and exact description thereof, reference being had to the accompanying drawings, and to the letters of reference marked thereon, which form a part of this specification.

This invention relates to electric railways of that class embracing a slotted conduit in which the conductor which supplies the electric current to the motor on the car is located, and a traveling contact device carried by the car and moving within the conduit for conveying the current from the conductor therein to the said motor, and more especially to the supporting bar which is attached to the car and extends through the slot of the conduit into the latter, and which supports the traveling contact device.

The invention consists in the matters hereinafter described and pointed out in the appended claims.

In the accompanying drawings illustrating the invention: Figure 1 is a view in side elevation of a supporting-bar and traveling contact device thereon together with adjacent parts upon the car by which the bar is sustained. Fig. 2 is an edge view of the bar, showing the same parts that are seen in Fig. 1. Fig. 3 is a detail section of the bar taken on line 3—3 of Fig. 1.

As shown in said drawings, A indicates a supporting-bar for a traveling contact device and B a traveling contact device on the lower end of the said supporting-bar. The supporting bar A is mounted on the car or car truck in such manner as to be laterally movable thereon.

C C indicate the side walls of the conduit, which approach each other at their upper margins to form the slot $c$ through which the bar A travels.

D indicates a conductor within the conduit, employed to supply current to the motor on the car.

The particular traveling contact device illustrated is like that shown and described in a prior Letters Patent, No. 497,377, granted to me May 16, 1893, and embraces a vertically swinging arm B' and carrying on its outer or free end an upright $b$ on the upper end of which is mounted a grooved wheel or trolley $B^2$ which, by the action of a spring $B^3$ forming part of the arm B', is pressed upwardly into contact with the conductor D; the upright $b$ being connected with the arm B' and the arm being connected with the supporting bar by vertical pivots or swiveled joints so as to give freedom of movement to the trolley, enabling it to easily follow the conductor in passing around curves and elsewhere, as fully set forth in said application.

The means shown for securing the supporting bar on the car or truck is like that shown and claimed in a prior patent, No. 511,346, granted to John C. Love December 26, 1893, the same comprising a longitudinally arranged carrying bar E to which the supporting bar A is directly attached and by which it is immediately supported; the said carrying bar being provided with a vertical slot through which the bar A is inserted and in which it is adapted to slide vertically for purposes of adjustment, and also with a latch $e$ adapted to be opened to permit the said bar A to be removed laterally from its place in the said slot.

The carrying bar E is arranged longitudinally of the car or truck and adapted to move or slide laterally thereon at both ends, the ends of the carrying bar being supported by means of cross-pieces $e'$ $e'$ $e^2$ $e^2$ which form guides for the ends of the carrying bar, on which the same rest and slide. Means are provided for holding either end of the carrying bar from lateral movement while leaving the other end free to swing or oscillate, consisting of studs $e^3$ $e^3$ on the bar adapted to engage central notches $e^4$ $e^4$ in the cross-pieces, these parts being so arranged that the end of the carrying bar which is forward (referring to the direction of motion of the car) will be confined, while its rear end will be free to oscillate or vibrate and thus permit the supporting bar to move freely through the conduit-slot in the forward movement of the car, as fully set forth in said prior application.

The supporting bar A consists, as herein shown, of two flat plates A' A', each containing on its inner face two longitudinal grooves $a\ a$, the grooves of the two plates being arranged opposite each other so as to form passages in which are placed the insulated conductors F F which serve to carry the current from the traveling contact device to the motor on the car. The two plates forming the supporting bar are secured together, preferably by screws $a'\ a'\ a'$ located near the outer margins of the plates and at the center thereof, between the conductors F F. The said screws $a'\ a'\ a'$ preferably have countersunk heads by which the supporting bar is made flat or smooth on its side face. The said supporting bar is provided at both its forward and rear edges with separate inserted pieces or wearing blocks G G which are located at such point on the bar as to come opposite and take the wear of the sides of the conduit slot when the bar is in working position. The blocks G G are made of the same thickness as or slightly thicker than the main part of the supporting bar, and said blocks are attached to the bar in such manner that they can be easily removed therefrom, while at the same time they are firmly and rigidly attached, so as to prevent detachment thereof under the strains to which they are subjected in the operation of the road.

In the particular construction shown the inserted pieces or blocks G G are generally rectangular in shape and are fitted in similarly shaped notches $a^2\ a^2$ formed in the side edges of the supporting bar, so that the blocks are exposed at both sides of the bar and also at the edges thereof. The outer corners or angles $g\ g$ of the blocks thus inserted form in effect the angles or corners of the bar. As a means of fastening the blocks to the bar the latter is shown as provided at the upper and lower ends of the notches $a^2\ a^2$ with recesses $a^3\ a^3$ opening at the edges of the bar and adapted to receive projecting parts $g'\ g'$ on the ends of the blocks.

As herein shown the notches $a^3\ a^3$ are made of V shape, and the ends of the inserted pieces or blocks are similarly shaped to form the projections $g'\ g'$, but the same results may be produced by interfitting or interlocking parts, or recesses or projections on the bar and blocks, the interlocking parts on the bar and blocks serving to hold the blocks rigidly and strongly in place while allowing the blocks to be easily removed and replaced. The blocks may be held in the recesses $a^2\ a^2$ in any suitable or convenient manner. As herein shown countersunk screws $g^2\ g^2$ inserted into the ends of the blocks from one side of the supporting bar, serve to prevent the blocks from being removed from the recesses; the heads of said screws being arranged to enter recesses formed partially in the blocks and partially in the adjacent parts of the bar.

In the operation of an electric railway having a supporting bar arranged to move through the slot of a conduit, as described, it is found that the bar becomes rapidly worn away where the sides of the slot come in contact therewith, and that the wearing away takes place first and most rapidly at the edges or angles of the bar. The wear on the bar, if long continued, will finally result in the channels for the conductors being reached, with the result of destroying the insulation thereof and exposure of the conductors, or the bar will become so weakened as to be of no further value. The renewal of the bars involves considerable expense, both by reason of the fact that they are themselves expensive to make because of the channels therein, and from the fact that the insertion of the insulated conducting wires and their proper connection with the trolleys and car requires much time and careful hand labor. The inserted pieces or blocks G arranged as described, serve to take the first and greatest part of the wear on the bar, so that the latter may be used a considerable length of time before the metal of the blocks has been cut or worn away to such an extent as to expose the bar itself, or the central, integral part thereof, to wear. It follows that a bar provided with wearing blocks as described, may be kept in use until the blocks are worn down to a point which will endanger the adjacent parts of the bar itself, when the blocks may be removed and new ones substituted, thereby making the bar as good as a new one, with but a slight expense and a trifling amount of labor.

While I have shown my invention as applied to a supporting bar made of two connected plates having grooves for the conductors on their inner faces, the same features of construction may be applied equally well and with the same advantages to supporting bars which are made from one piece of metal or in which passages for the conductors are made or formed in a manner different from that shown.

The construction in which the supporting bar and wearing blocks are provided with interlocking recesses and projections separable from each other by a movement of the blocks in a direction edgewise of the bar, has the advantage of holding the blocks rigidly and securely against lateral displacement by sidewise pressure thereon; this being the direction in which the most considerable strain comes on the blocks, and this feature of construction is therefore herein claimed as one part of my invention.

The making of the notches $a^2\ a^2$ of V shape is of especial advantage in a bar made of two attached plates, as shown in the accompanying drawings, because such notches can be easily formed when the plates are separated or before they are placed together, by transversely beveling or inclining the end faces of the recesses in the plates which form the seats for the blocks when the plates are placed together.

I claim as my invention—

1. The combination, with a slotted conduit, a conductor therein and a traveling contact device, of a flat supporting bar having recesses at its side edges, and blocks inserted in said recesses and adapted for contact with the sides or edges of the conduit-slot, substantially as described.

2. The combination, with a flat supporting bar provided with a recess at its edge, of a wearing block inserted in said recess, said bar and the block having interlocking recesses and projections separable from each other by a movement of the block in a direction edgewise of the bar, and means for detachably securing the block in said recess, substantially as described.

3. The combination with a flat supporting bar provided with a recess at its edge which is provided at its upper and lower ends with notches opening at the side edge of the bar, a wearing block inserted in said recess and provided with projections at its ends entering said notches, and means for detachably securing the said block within the recess, substantially as described.

4. The combination with a flat supporting bar made of two connected plates and provided with a recess at its edge having V-shaped notches formed by beveling transversely the edges of the plates at the upper and lower ends of the said recess, of a wearing block inserted in the said recess and shaped at its upper and lower ends to fit the said notches, substantially as described.

In testimony that I claim the foregoing as my invention I affix my signature in presence of two witnesses.

PAUL C. JUST.

Witnesses:
C. CLARENCE POOLE,
TAYLOR E. BROWN.